(12) United States Patent
Samuel et al.

(10) Patent No.: US 10,513,889 B2
(45) Date of Patent: Dec. 24, 2019

(54) ROTATIONALLY SELECTABLE LOCK OF SHAFT TO HOUSING

(71) Applicant: Halliburton Energy Services, Inc., Houston, TX (US)

(72) Inventors: Geoffrey A. Samuel, Alberta (CA); Neil Roy Choudhury, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/066,612

(22) PCT Filed: Jan. 27, 2016

(86) PCT No.: PCT/US2016/015032
§ 371 (c)(1),
(2) Date: Jun. 27, 2018

(87) PCT Pub. No.: WO2017/131649
PCT Pub. Date: Aug. 3, 2017

(65) Prior Publication Data
US 2019/0195027 A1    Jun. 27, 2019

(51) Int. Cl.
| E21B 17/02 | (2006.01) |
| E21B 6/06 | (2006.01) |
| E21B 23/00 | (2006.01) |
| F16D 41/12 | (2006.01) |
| E21B 7/04 | (2006.01) |
| E21B 17/046 | (2006.01) |
| E21B 31/00 | (2006.01) |
| E21B 7/06 | (2006.01) |

(52) U.S. Cl.
CPC .............. *E21B 17/021* (2013.01); *E21B 6/06* (2013.01); *E21B 7/04* (2013.01); *E21B 7/067* (2013.01); *E21B 7/068* (2013.01); *E21B 17/046* (2013.01); *E21B 23/004* (2013.01); *E21B 31/00* (2013.01); *F16D 41/12* (2013.01)

(58) Field of Classification Search
CPC ........ E21B 6/06; E21B 17/021; E21B 17/046; E21B 23/004; F16D 41/12
See application file for complete search history.

(56) References Cited

U.S. PATENT DOCUMENTS

| 7,234,544 B2 | 6/2007 | Kent |
| 8,678,108 B1 | 3/2014 | Eriksen |

(Continued)

OTHER PUBLICATIONS

PCT International Search Report and Written Opinion dated Oct. 12, 2016 issued in corresponding application No. PCT/US2016/015032 filed on Jan. 27, 2016, 10 pgs.

*Primary Examiner* — David J Bagnell
*Assistant Examiner* — Tara E Schimpf
(74) *Attorney, Agent, or Firm* — Chamberlain Hrdlicka (57) ABSTRACT

A rotationally selectable lock apparatus includes an outer element having a plurality of locking pins that are radially spring loaded to extend and retract through the outer element. An inner element is substantially encircled by the outer element and coupleable to a driveshaft. The inner element is configured to cause the plurality of locking pins to retract through the outer element in response to the driveshaft rotating in a first direction and extend through the outer element to engage a housing in response to the driveshaft rotating in a second direction, opposite to the first direction.

20 Claims, 8 Drawing Sheets

(56) References Cited

U.S. PATENT DOCUMENTS

| | | | |
|---|---|---|---|
| 8,789,579 B2 | 7/2014 | Ollerenshaw et al. | |
| 9,777,540 B2 * | 10/2017 | Downie | E21B 4/02 |
| 2006/0021841 A1 * | 2/2006 | Kimes | F16D 41/12 |
| | | | 192/46 |
| 2014/0151019 A1 | 6/2014 | Gano | |
| 2015/0083541 A1 | 3/2015 | Purohit et al. | |
| 2015/0259996 A1 | 9/2015 | Tao et al. | |
| 2015/0376950 A1 * | 12/2015 | Su | E21B 4/16 |
| | | | 175/57 |

* cited by examiner

ROTATIONALLY SELECTABLE LOCK OF SHAFT TO HOUSING

BACKGROUND

Directional drilling may be used in hydrocarbon well drilling for many different reasons. For example, it may be desirable to drill in a certain direction to provide multiple wells from a single location, to access geological formation areas that are inaccessible from the surface location, or to avoid undesirable formations.

In directional drilling, a driveshaft is coupled to a drill string, on an uphole side of the driveshaft, and a rotary steerable system (RSS), on a downhole side of the driveshaft. With the RSS, the drill bit is able to be steered in a desired direction using a "push-the-bit" method or a "point-the-bit" method. In the "push-the-bit" method, the driveshaft is directed to the desired direction by a reactive force imparted on the driveshaft from contact with the borehole. In the "point-the-bit" method, the driveshaft connected to the drill bit is flexed to direct the bit in the desired direction.

In the "point-the-bit" method, a reference housing through which the driveshaft extends is not connected to the driveshaft in a torsional direction to enable the driveshaft to rotate freely within the housing. This becomes a problem when the housing becomes stuck in the borehole.

DETAILED DESCRIPTION

To address some of the challenges described above, as well as others, a rotationally selectable lock apparatus is used to couple the torque of a driveshaft to a housing in which it is rotating. Thus, when the housing becomes stuck in a borehole, the driveshaft torque may be used to rotate the housing and free it from the borehole. Examples of such embodiments are now described in detail.

Figure 1:
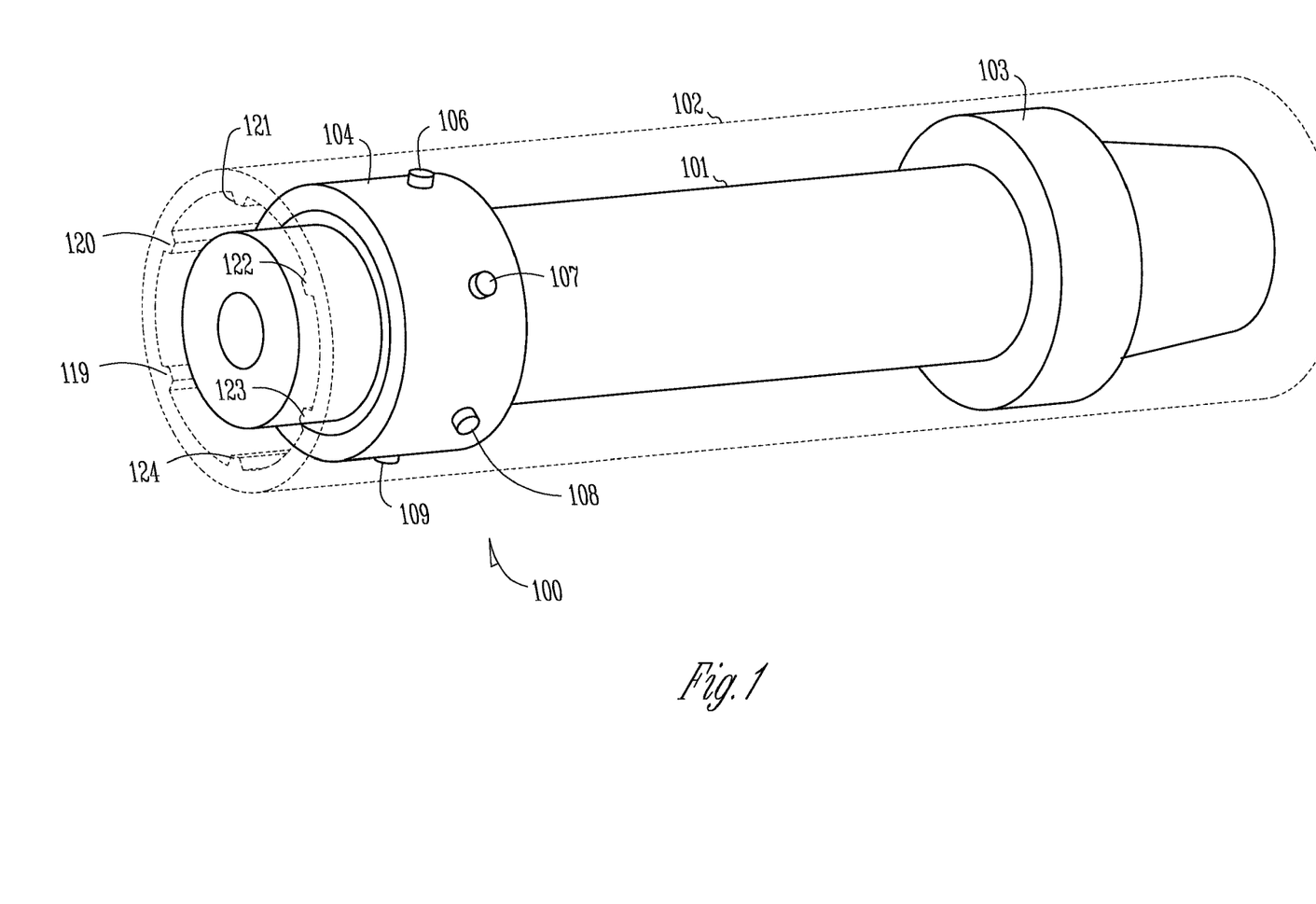
FIG. 1 is a diagram of a driveshaft in a housing including a rotationally selectable lock apparatus, according to various embodiments.

FIG. 1 is a diagram of a driveshaft 101 in a housing 102 including a rotationally selectable lock apparatus 100, according to various embodiments. This diagram represents a view of the tool in a straight condition with no steering forces imparted onto the driveshaft 101.

The left side of the figure represents the uphole side if the driveshaft 101 and the right side of the figure represents the downhole side of the driveshaft. The driveshaft 101 extends and rotates axially through the housing 102. In an embodiment, the uphole side of the driveshaft 101 is coupled to the drillstring that may be coupled to a drilling rig rotary table or a motor (e.g., mud motor) to apply a torque to the driveshaft 101. The downhole side of the driveshaft 101 may be coupled to the RSS that may be coupled to a drill bit that provides the torque to the drill bit for drilling in a geological formation. The orientation of the rotationally selectable lock apparatus 100 as shown is for purposes of illustration only as the apparatus 100 may be located on any part of the drive shaft 101 within the housing 102

A bearing 103 is shown located on one end of the driveshaft 101. The bearing 103, in combination with an outer surface 104 of the apparatus 100, locates the driveshaft 101 in the housing 102 in an axial direction along a longitudinal length of the housing 102 but allows for relative rotation between the two components 101, 102. The bearing 103 may be spherical bearing to allow for radial movement of the driveshaft 101 within the housing 102 when steering forces are imparted on the driveshaft 101 for purposes of steering e drill bit (not shown).

Figure 2:
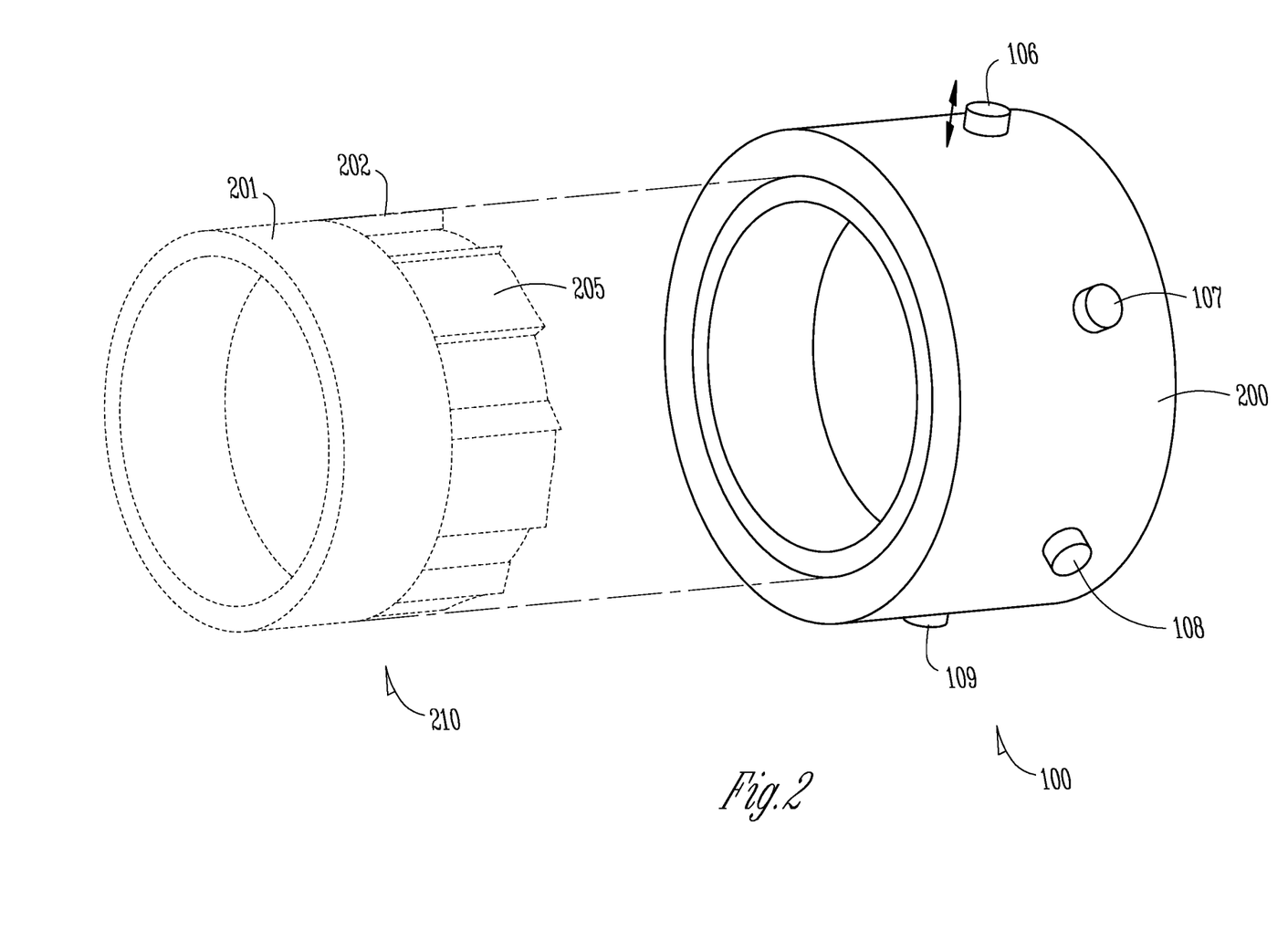
FIG. 2 is an exploded diagram showing the rotationally selectable lock apparatus, according to various embodiments.

The rotationally selectable lock apparatus 100 is shown in FIG. 1 and shown and described in greater detail with reference to FIGS. 2-6. The apparatus 100 illustrated in FIG. 2 is not drawn to any scale. It may take up only a relatively small portion of the housing 102, such as the width of a bearing 103, or be expanded to comprise a larger width. The apparatus 100 includes the outer surface 104 having a plurality of lock pins 106-109 that project through the outer surface 104 and interact with elements of the housing 102 as subsequently described.

The housing 102 has an inner surface comprising a plurality of splines 119-124 that project into the interior of the housing 102 and extend longitudinally along a longitudinal dimension of the housing 102. The plurality of splines 119-124 may be coupled to the housing 102 in some manner or formed integral with the housing 102.

FIG. 2 is an exploded diagram showing the rotationally selectable lock apparatus 100, according to various embodiments. The apparatus 100 comprises an outer element 200 that retains locking pins 106-109 that are radially spring loaded with respect to the outer element 200.

The outer element 200 encircles an inner element 210 having an outer race 201 and an inner race 202. The inner element 210 is coupleable to the driveshaft while the outer element 200 may be coupled to the housing 102 or left floating such that it may not rotate with the driveshaft in an unlock mode. The outer race 201 is a bearing that, when the driveshaft rotates in a first direction (i.e., the apparatus 100 is in the unlock mode), provides a bearing surface for contact against an inner surface of the outer element 200.

The inner race 202 comprises a plurality of engagement areas 205 that engage with their respective lock pin 106-109 to transfer torque from the driveshaft 101 to the housing 102. The inner race 202 may have the same quantity of engagement areas 205 as the quantity of lock pins 106-109 or, in other embodiments, the number of engagement areas 205 and the number of lock pins 106-109 may differ.

The inner element 210 is located within the outer element 200 as shown subsequently with reference to operational diagrams FIGS. 3-6. The orientation of the inner element 210 is such that the inner race 202 is located substantially under the lock pins 106-109 and the outer race 201 is located on either side of the lock pins 106-109.

Figure 3:
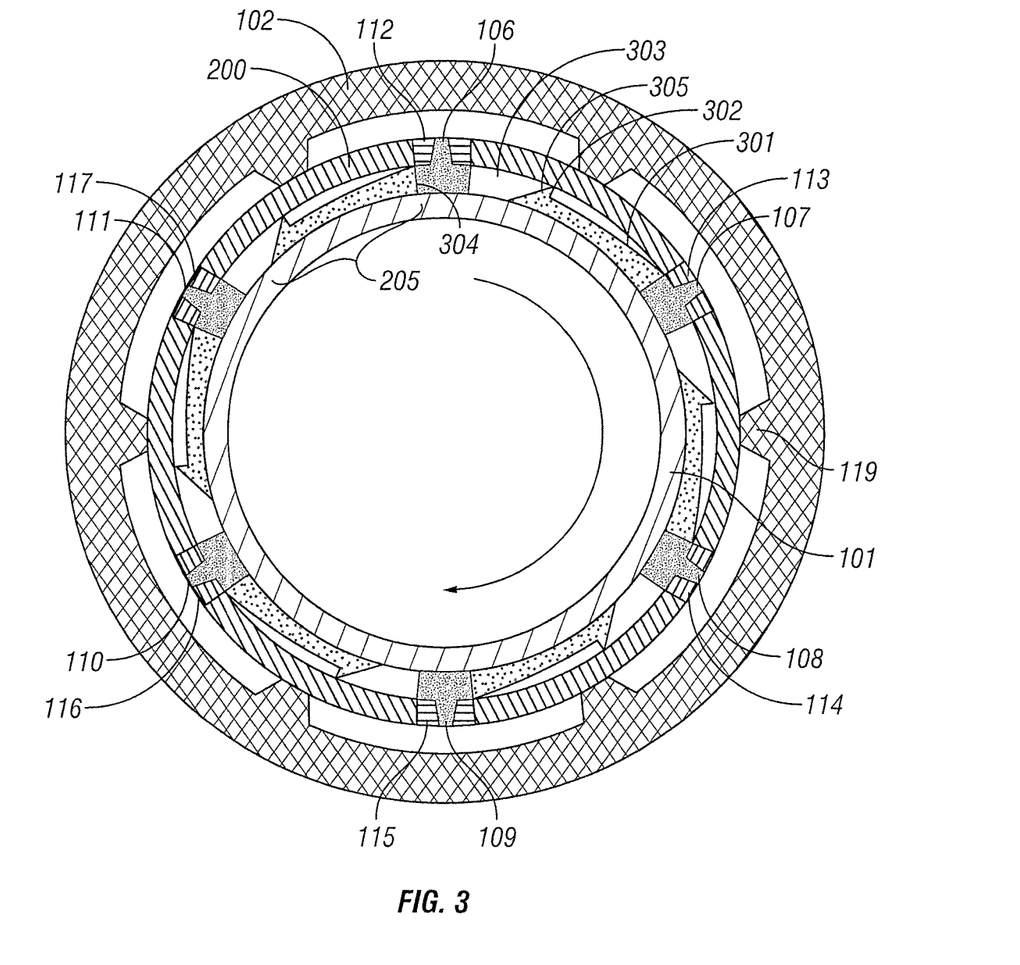
FIG. 3 is a diagram showing an end view of an operation of the rotationally selectable lock apparatus in an unlocked mode, according to various embodiments.

FIG. 3 is a diagram showing an end view of an operation of the rotationally selectable lock apparatus 100 in an unlocked mode, according to various embodiments. In this figure and subsequent operational figures, the driveshaft 101 is shown rotating in a clockwise direction during the unlocked mode and a counter-clockwise direction to engage the lock mode. These directions are for purposes of illustration only to correspond with a "normal" rotation of a rotary table and/or mud motor. Other embodiments may reverse these directions.

The diagram shows the driveshaft 101 located within the housing 102 with the apparatus 100 located between the driveshaft 101 and the housing 102. The driveshaft 101 is rotating clockwise within the housing in the unlocked mode with the locking pins 106-111 not engaged with the splines 119-124 of the housing.

During the unlocked mode, the locking pins 106-111 are located between engagement areas 205 in a release area 303 bordered by adjacent engagement areas 205. An unlock push surface 304 of an engagement area 205 may contact a respective locking pin 106-111 to apply pressure to that respective lock pin and rotate the apparatus 100 within the housing. Since the locking pins 106-111 do not extend above the outer surface of the outer element 200, the locking pins 106-111 cannot engage the splines 110 of the housing 102.

Figure 4:
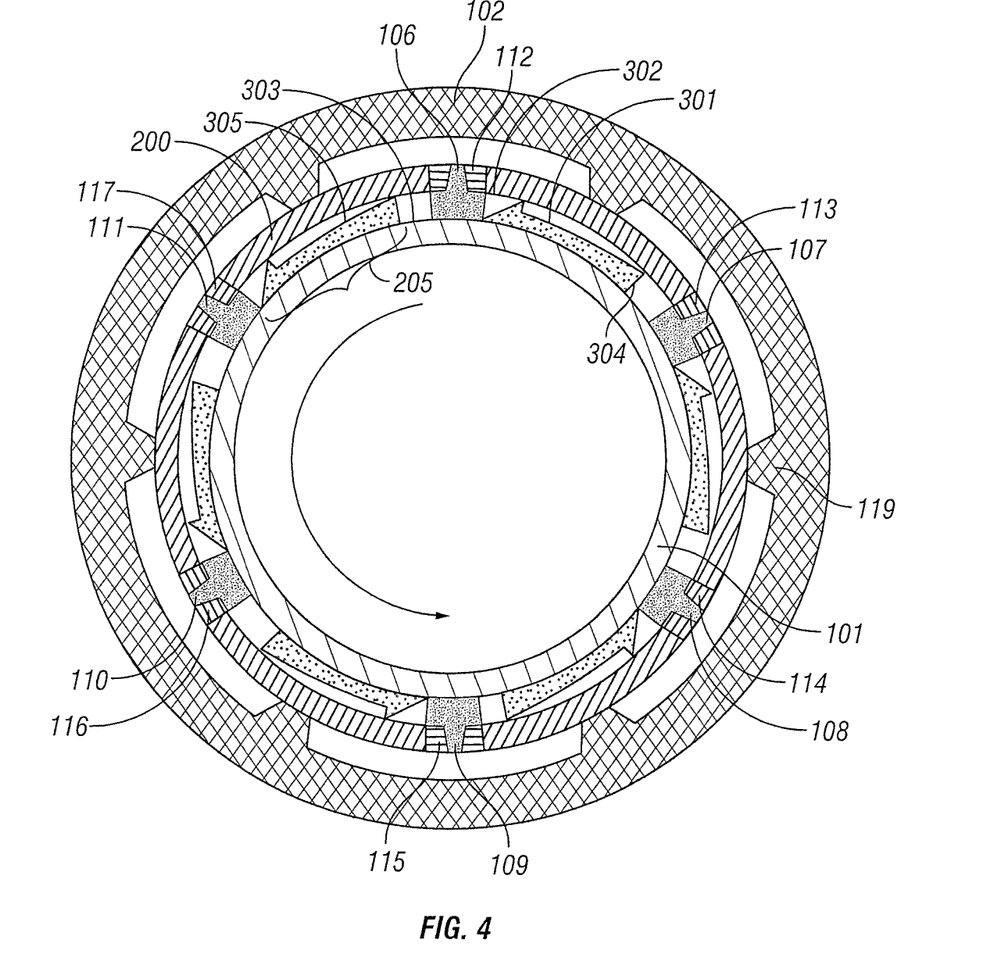
FIG. 4 is a diagram showing an end view of an operation of the rotationally selectable lock apparatus transitioning to a locked mode, according to various embodiments.

The end view illustrates the various elements that make up each engagement area 205. A ramp 305 ramps up from the release area 303 to a lock area 301 that is adjacent to a lock push surface 302 at the interface of the ramp 305 to the lock area 301. The lock push surface 302 may be part of the ramp 305 when the ramp 305 rises to a higher level than the lock area 301. The ramp 305 for each engagement area 205 is located and shaped such that an adjacent locking pin 106-111 is able to ride along the ramp until reaching the lock area 301 as shown in FIG. 4. The lock push surface 302 contacts its respective locking pin 106-111 in the lock mode to transfer the driveshaft torque to the lock pin that, in turn, transfers the torque to the respective housing spline in contact with the locking pin 106-111.

The engagement areas 205 are only one way to cause the locking pins 106-111 to extend and retract through the outer element 200. Other ways, coupleable to the driveshaft, may be used to cause the locking pins 106-111 to retract when the driveshaft rotates in a first direction and extend when the driveshaft rotates in a second, opposite direction.

FIG. 4 is a diagram showing an end view of an operation of the rotationally selectable lock apparatus 100 transitioning to a locked mode, according to various embodiments. In this figure, the rotation of the driveshaft 101 has been reversed (e.g., counterclockwise) in order to engage the locked mode.

The rotation of the driveshaft 101 in the counterclockwise direction causes the lock pins to exit the release area 303 and ride up the ramp 305 towards the lock area 301. The inward (i.e., toward the center axis of the driveshaft 101) radial spring force exerted by springs 112-117 on the locking pins 106-111 forces the locking pins 106-111 to substantially remain in contact with the ramp 305 as it moves upward towards the lock area 301. As the locking pins 106-111 approach the top of the ramp 305, an upper portion of each locking pin 106-111 begins to extend beyond the outer surface of the outer element 200.

Figure 5:
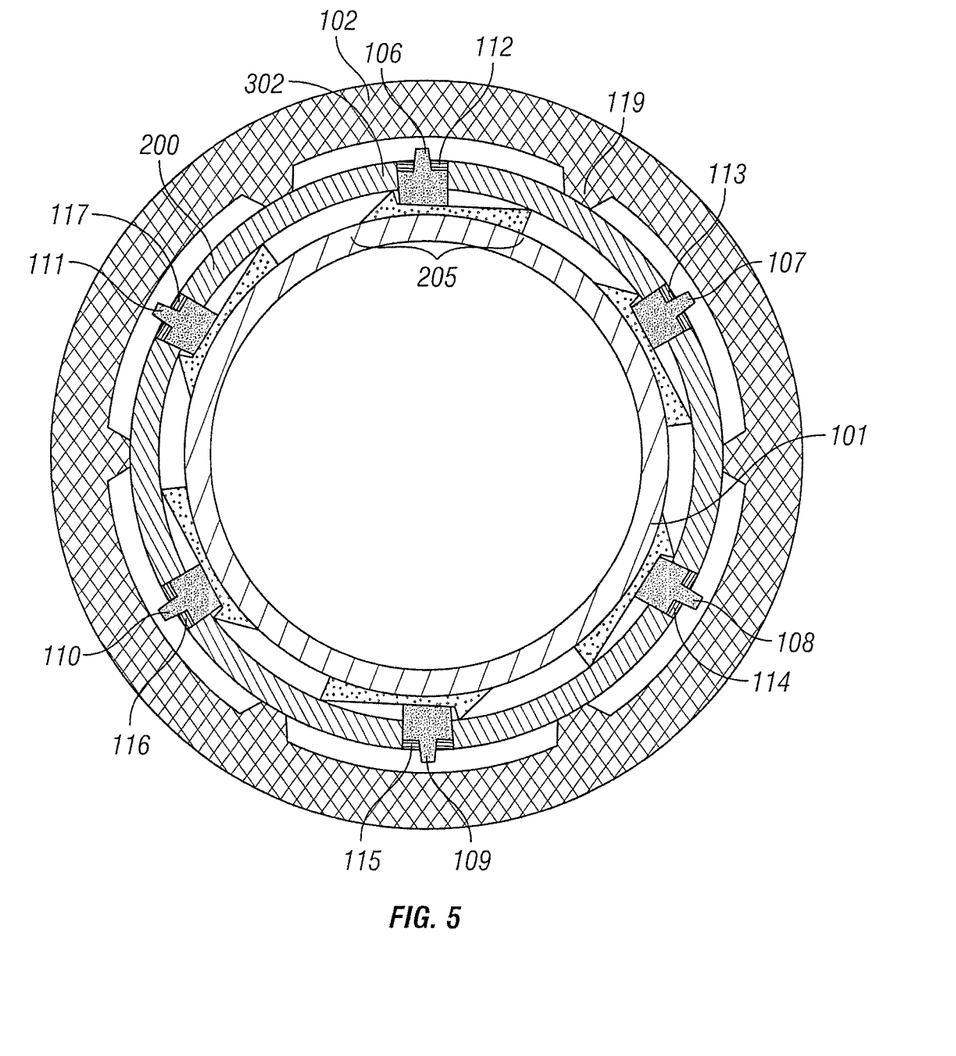
FIG. 5 is a diagram showing an end view of an operation of the rotationally selectable lock apparatus in the locked mode, according to various embodiments.

FIG. 5 is a diagram showing an end view of an operation of the rotationally selectable lock apparatus 100 in the locked mode, according to various embodiments. The locking pins 106-111 have landed in their respective lock area 301 of each engagement area 205. The upper portion of each locking pin 106-111 extends through the outer element 200 due to the relatively higher elevation of the lock area 301 as compared to the release area 303, relative to the driveshaft 101. Each locking pin 106-111 is also in contact with its respective lock push surface 302 between the ramp 305 and the lock area 301.

Figure 6:
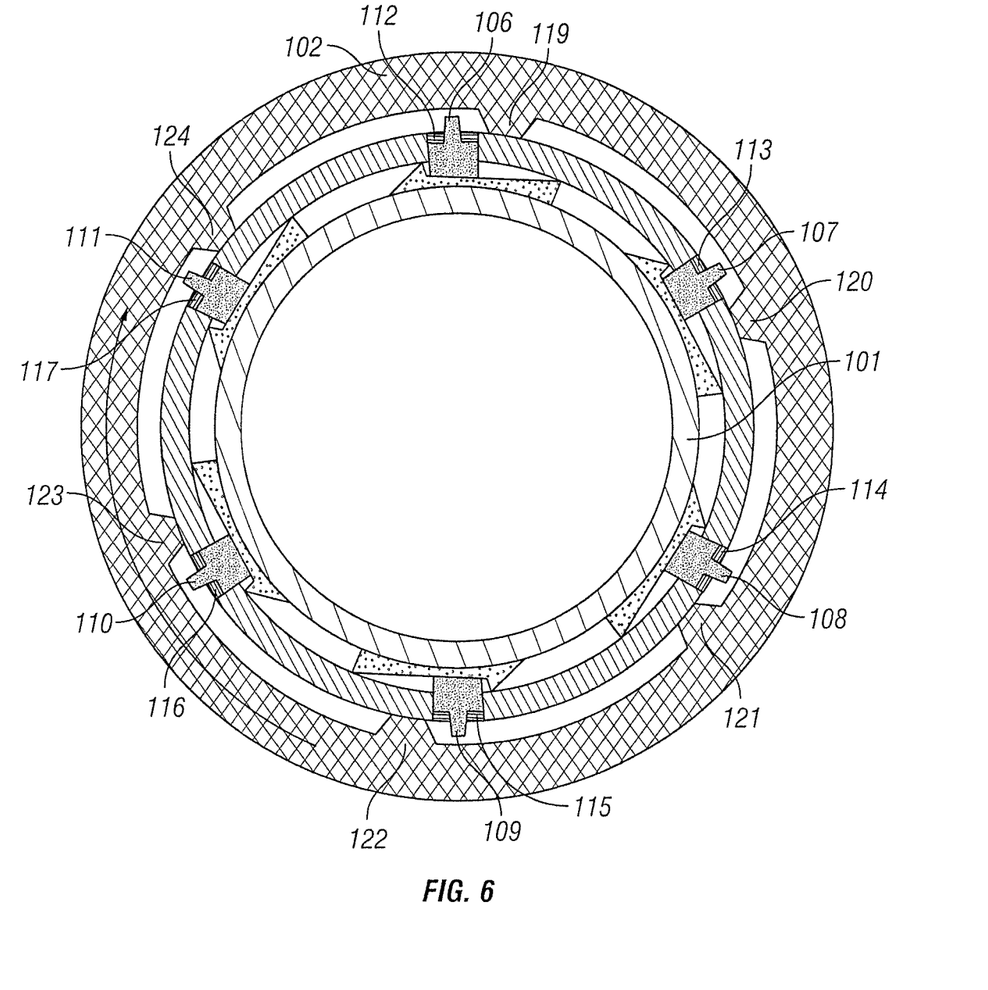
FIG. 6 is a diagram showing an end view of an operation of the rotationally selectable lock apparatus in the lock mode transferring driveshaft torque to a housing, according to various embodiments.

FIG. 6 is a diagram showing an end view of an operation of the rotationally selectable lock apparatus 100 in the lock mode transferring driveshaft torque to a housing 102, according to various embodiments. As the driveshaft 101 continues to rotate in the counterclockwise direction, each extended locking pin 106-111 contacts a respective housing spline 119-124. The contact of the locking pin 106-111 with its respective housing spline 119-124 enables the locking pin 106-111 to push against its respective spline 119-124 in order to transfer at least a portion of the torque from the driveshaft 101 to the housing 102. Thus, if the housing 102 was rendered substantially immobile in a borehole, the transfer of torque to the housing 102 may free the housing from the borehole.

Once the housing is free from the borehole and it is desired to return to the unlocked mode, the rotational direction of the driveshaft 101 may be reversed from the lock rotation direction such that the locking pins 106-111 ride along their respective lock area 301 to the adjacent release area where the radial spring force on the locking pins 106-111 forces each pin back in to the release area.

Figure 7:
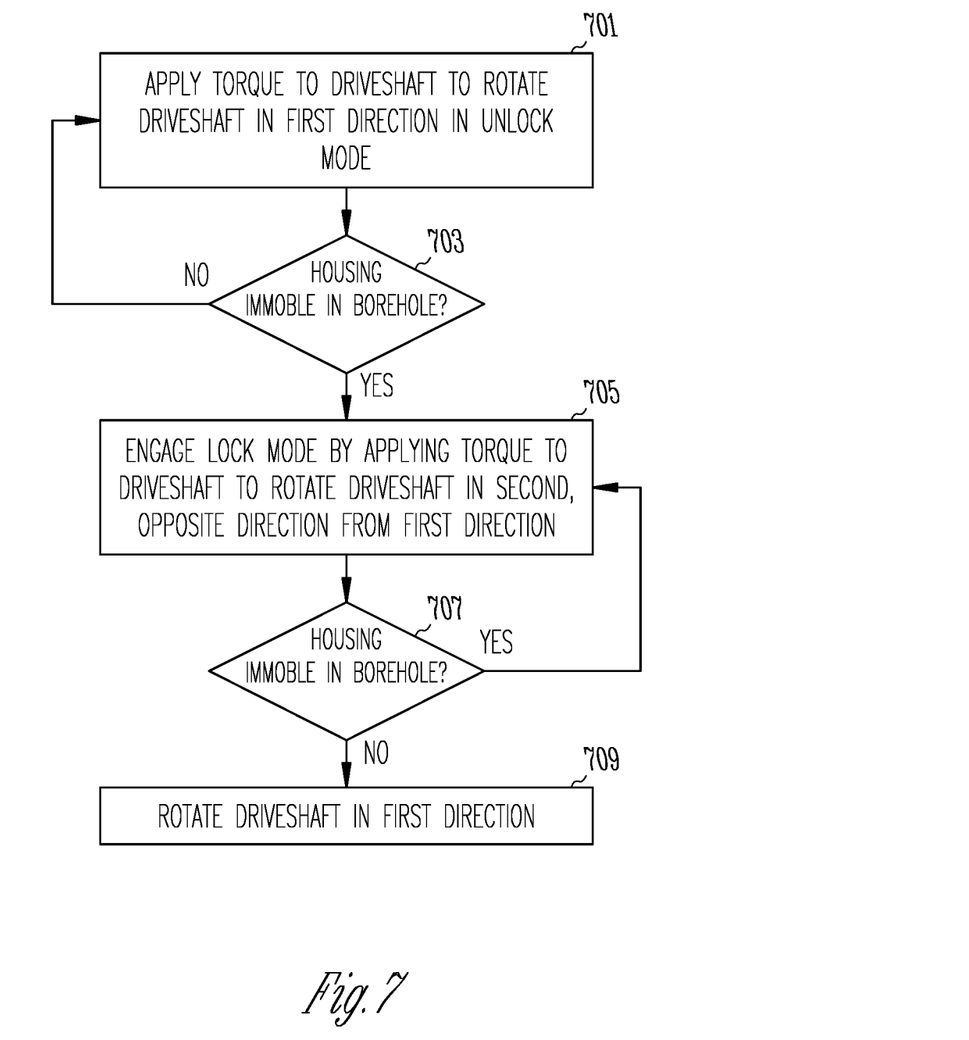
FIG. 7 is a flowchart showing a method for drilling using the rotationally selectable lock apparatus, according to various embodiments.

FIG. 7 is a flowchart showing a method for drilling using the rotationally selectable lock apparatus, according to various embodiments. In block 701, a first torque is applied to the driveshaft. This enables the driveshaft to rotate within the housing, during the first or unlocked mode, in a first direction (e.g., clockwise).

In block 703, the housing is monitored to determine if it is substantially immobile in the borehole. When the housing becomes substantially immobile in the borehole, the rotation of the driveshaft is reversed. This is accomplished by applying a second torque in an opposite direction to cause the rotationally selectable apparatus 100 to switch to a second or locked mode. In the lock mode, each locking pin 106-111 extends from the driveshaft and engages a respective housing spline 119-124 and transfers at least a portion of the second torque from the driveshaft 101 to the housing 102. In blocks 705 and 707, the reverse rotation of the driveshaft is maintained and the lock pins engaged in the lock mode until the housing is able to move within the borehole again. Once the housing is free to move, the driveshaft rotation direction is reversed in block 709 to return the apparatus to the unlocked mode and allow the driveshaft to rotate freely within the housing.

Figure 8:
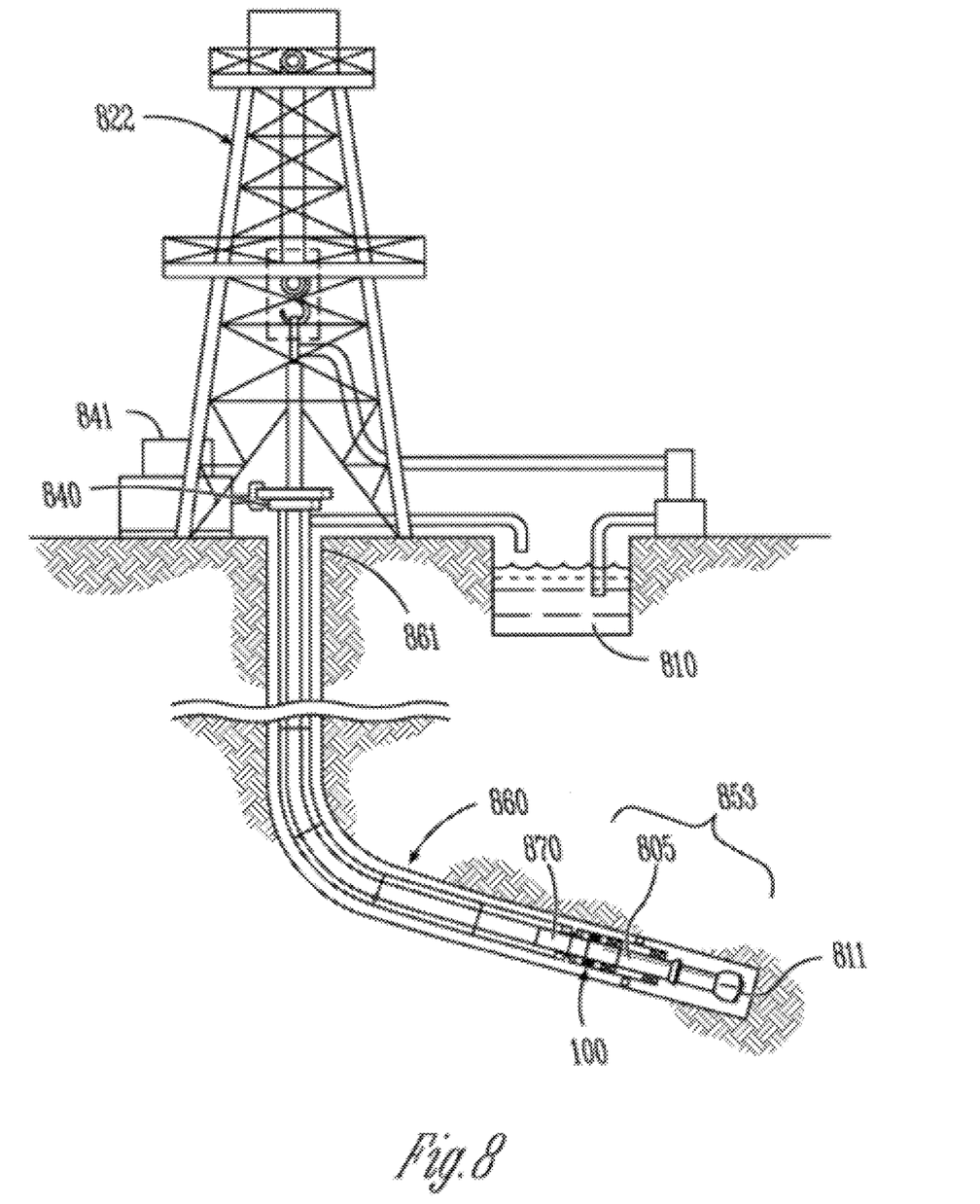
FIG. 8 is a diagram of a drilling system, according to various embodiments.

FIG. 8 is a diagram of a drilling system, according to various embodiments. The BHA 853 is shown at the lower end of the drillstring 860 in a borehole 861. The BHA 853 includes a drill bit 811 disposed at the lower or downhole end of the drillstring 860. The BHA 853 further includes the rotationally selectable lock apparatus 100, as discussed previously, disposed circumferentially between the housing and the driveshaft.

The BHA 853 further includes an RSS 805 that is operatively coupled to between the drill bit 811 and the driveshaft such that rotational forces from the driveshaft are imparted to the operationally coupled parts of the RSS 805 and, in turn, to the drill bit 811. In such embodiments, some portions of the RSS 805 (e.g., its housing and components disposed thereon) may be operated as substantially non-rotating portions.

The drillstring 860 is supported by the drill rig 822 that includes a rotary table 840 for rotating the drill string 860. In some embodiments, the BHA 853 may include a mud motor 870, which may be actuated or otherwise activated so as to impart rotational forces upon the drill bit 811 in addition to or instead of the rotary table 840. The mud motor 870 includes a rotor and a stator that together use the Moineau principle to rotate the drillstring 860 as a result of the pumping of a fluid (e.g., drilling mud) 810 through the mud motor 870.

A controller 841 may execute the method illustrated in FIG. 8 by controlling the direction of torque applied to the drillstring and, thus, to the driveshaft. While the controller 841 is shown on the surface of FIG. 8, other embodiments may locate the controller 841 downhole in the BHA 853 or other locations of the drillstring 860.

Example 1 is a rotationally selectable lock apparatus comprising: an outer element having a plurality of locking pins radially spring loaded to extend and retract through the outer element; and an inner element substantially encircled by the outer element and coupleable to a driveshaft, the inner element configured to cause the plurality of locking pins to retract through the outer element in response to the driveshaft rotating in a first direction and extend through the outer element to engage a housing in response to the driveshaft rotating in a second direction, opposite to the first direction.

In Example 2, the subject matter of Example 1 can further include wherein the inner element further comprises a bearing race that is operational in response to the driveshaft rotating in the first direction.

In Example 3, the subject matter of Examples 1-2 can further include wherein the inner element further comprises a plurality of engagement areas and a plurality of release areas, each release area bordered by adjacent engagement areas, wherein each release area is configured to enable a respective locking pin of the plurality of locking pins to retract through the outer element in response to the driveshaft rotating in the first direction and each engagement area is configured to push a respective locking pin through the outer element to engage the housing in response to the driveshaft rotating in the second direction.

In Example 4, the subject matter of Examples 1-3 can further include wherein each radially spring loaded locking pin is forced into the release area by the radial spring force.

In Example 5, the subject matter of Examples 1-4 can further include wherein each engagement area comprises: a ramp adjacent to a respective release area of the plurality of release areas, the ramp having a lower end and an upper end; a lock area having a first level wherein the first level is lower than a level of the upper end of the ramp such that a lock push surface is formed at the interface of the ramp to the lock area.

In Example 6, the subject matter of Examples 1-5 can further include wherein each lock area is adjacent to a second respective release area on an opposite side of the engagement area from the respective release area.

In Example 7, the subject flatter of Examples 1-6 can further include wherein a quantity of the plurality of engagement areas is the same as a quantity of the plurality of locking pins.

In Example 8, the subject matter of Examples 1-7 can further include wherein each locking pin corresponds with a respective engagement area in a lock mode in response to the driveshaft rotating in the second direction.

In Example 9, the subject matter of Examples 1-8 can further include wherein each locking pin corresponds with a respective release area in an unlock mode in response to the driveshaft rotating in the first direction.

In Example 10, the subject matter of Examples 1-9 can further include wherein the housing comprises a plurality of splines extending longitudinally through the housing, the plurality of locking pins are configured to contact a corresponding spline when the driveshaft rotates in the second direction such that torque from the drive shaft is transferred to the housing.

Example 11 is a method for drilling a borehole, the method comprising: applying a first torque to a driveshaft to rotate the driveshaft in a first direction within a housing to activate an unlock mode; and applying a second torque to the driveshaft to rotate the driveshaft in a second direction, opposite from the first direction, to active a lock mode wherein a plurality of locking pins are extended from the driveshaft to engage the housing and transfer at least a portion of the second torque to the housing.

In Example 12, the subject matter of Example 11 can further include wherein applying the applying the second torque comprises applying the second torque when the housing is substantially immobile within the borehole.

In Example 13, the subject matter of Examples 11-12 can further include applying the first torque after the second torque when the housing is no longer substantially immobile within the borehole.

In Example 14, the subject matter of Examples 11-13 can further include during the lock mode, the plurality of locking pins transfers at least the portion of the second torque to a plurality of splines coupled to an inner surface of the housing.

In Example 15, the subject matter of Examples 11-14 can further include applying the first torque to the driveshaft to rotate a drill bit coupled to the driveshaft.

Example 16 is a drilling system comprising: a drillstring, coupled to a motor or a rotation table that are configured to provide a torque to the drillstring, a driveshaft coupled between the drillstring and a drill bit to transfer the torque to the drill bit, the driveshaft configured to rotate axially within a housing comprising a plurality of splines extending longitudinally through the housing, the driveshaft configured to rotate in a first direction in an unlock mode and a second, opposite direction in a lock mode; and a rotationally selectable lock apparatus disposed circumferentially between the housing and the driveshaft, the apparatus comprising: an outer element having a plurality of locking pins, each locking pin radially spring loaded to force the locking pin below contact with the splines during the unlock mode; and an inner element substantially encircled by the outer element and coupled to the driveshaft, the inner element comprising a plurality of engagement areas that force the plurality of locking pins to engage a respective spline in response to the lock mode.

In Example 17, the subject matter of Example 16 can further include a plurality of release areas alternating with the plurality of engagement areas.

In Example 18, the subject matter of Examples 16-17 can further include wherein each engagement area further comprises a lock area wherein the plurality of release areas have a lower level relative to the lock area.

In Example 19, the subject matter of Examples 16-18 can further include wherein each locking pin is radially spring loaded to force the locking pin inward towards the driveshaft.

In Example 20, the subject matter of Examples 16-19 can further include wherein each engagement area comprises a lock push surface that contacts a respective locking pin in the lock mode to transfer the torque to the locking pin such that the locking pin transfers the torque to its respective spline.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A rotationally selectable lock apparatus comprising:
    an outer element having a plurality of locking pins radially spring loaded to extend and retract through the outer element; and
    an inner element encircled by the outer element and coupleable to a driveshaft, the inner element configured to cause the plurality of locking pins to retract through the outer element in response to the driveshaft rotating in a first direction and extend through the outer element to engage a housing in response to the driveshaft rotating in a second direction, opposite to the first direction.

2. The rotationally selectable lock apparatus of claim 1, wherein the inner element further comprises a bearing race that is operational in response to the driveshaft rotating in the first direction.

3. The rotationally selectable lock apparatus of claim 1, wherein the inner element further comprises a plurality of engagement areas and a plurality of release areas, each release area bordered by adjacent engagement areas, wherein each release area is configured to enable a respective locking pin of the plurality of locking pins to retract through the outer element in response to the driveshaft rotating in the first direction and each engagement area is configured to push the respective locking pin through the outer element to engage the housing in response to the driveshaft rotating in the second direction.

4. The rotationally selectable lock apparatus of claim 3, wherein each radially spring loaded locking pin is forced into the release area by the radial spring force.

5. The rotationally selectable lock apparatus of claim 3, wherein each engagement area comprises:
    a ramp adjacent to a respective release area of the plurality of release areas, the ramp having a lower end and an upper end; and
    a lock area having a first level wherein the first level is lower than a level of the upper end of the ramp such that a lock push surface is formed at the interface of the ramp to the lock area.

6. The rotationally selectable lock apparatus of claim 5, wherein each lock area is adjacent to a second respective release area on an opposite side of the engagement area from the respective release area.

7. The rotationally selectable lock apparatus of claim 3, wherein a quantity of the plurality of engagement areas is the same as a quantity of the plurality of locking pins.

8. The rotationally selectable lock apparatus of claim 3, wherein each locking pin corresponds with a respective engagement area in a lock mode in response to the driveshaft rotating in the second direction.

9. The rotationally selectable lock apparatus of claim 3, wherein each locking pin corresponds with a respective release area in an unlock mode in response to the driveshaft rotating in the first direction.

10. The rotationally selectable lock apparatus of claim 1, wherein the housing comprises a plurality of splines extending longitudinally through the housing, the plurality of locking pins are configured to contact a corresponding spline when the driveshaft rotates in the second direction such that torque from the drive shaft is transferred to the housing.

11. A method for drilling a borehole, the method comprising:
    applying a first torque to a driveshaft to rotate an inner element coupled to the driveshaft in a first direction within a housing to activate an unlock mode, wherein a plurality of radially spring loaded locking pins of an outer element encircling the inner element retract through the outer element; and
    applying a second torque to the driveshaft to rotate the driveshaft in a second direction, opposite from the first direction, to active a lock mode wherein the plurality of locking pins are extended through the outer element to engage the housing and transfer at least a portion of the second torque to the housing.

12. The method of claim 11, wherein applying the second torque comprises applying the second torque when the housing is immobile within the borehole.

13. The method of claim 12, further comprising applying the first torque after the second torque when the housing is no longer immobile within the borehole.

14. The method of claim 11, wherein, during the lock mode, the plurality of locking pins transfers at least the portion of the second torque to a plurality of splines coupled to an inner surface of the housing.

15. The method of claim 11, further comprising applying the first torque to the driveshaft to rotate a drill bit coupled to the driveshaft.

16. A drilling system comprising:
    a drillstring coupled to a motor or a rotation table that are configured to provide a torque to the drillstring;
    a driveshaft coupled between the drillstring and a drill bit to transfer the torque to the drill bit, the driveshaft configured to rotate within a housing comprising a plurality of splines extending longitudinally through the housing, the driveshaft configured to rotate in a first direction in an unlock mode and a second, opposite direction in a lock mode; and
    a rotationally selectable lock apparatus disposed circumferentially between the housing and the driveshaft, the apparatus comprising:
        an outer element having a plurality of locking pins, each locking pin radially spring loaded to force the locking pin to disengage from the splines during the unlock mode; and
        an inner element encircled by the outer element and coupled to the driveshaft, the inner element comprising a plurality of engagement areas that force the plurality of locking pins to engage a respective spline in response to the lock mode.

17. The drilling system of claim 16, further comprising a plurality of release areas alternating with the plurality of engagement areas.

18. The drilling system of claim 17, wherein each engagement area further comprises a lock area wherein the plurality of release areas have a lower level relative to the lock area.

19. The drilling system of claim 16, wherein each locking pin is radially spring loaded to force the locking pin inward towards the driveshaft.

20. The drilling system of claim 16, wherein each engagement area comprises a lock push surface that contacts a respective locking pin in the lock mode to transfer the torque to the locking pin such that the locking pin transfers the torque to its respective spline.

* * * * *